US012506303B2

(12) United States Patent
Wu et al.

(10) Patent No.: US 12,506,303 B2
(45) Date of Patent: Dec. 23, 2025

(54) ELECTRICAL CONNECTOR WITH IMPROVED INSERTING MEMBER

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Xun Wu, Huaian (CN); Ming-Yi Gong, Huaian (CN); Hung-Chi Yu, New Taipei (TW); Wen-Lung Hsu, New Taipei (TW); Guo-Xiang Niu, Huaian (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 354 days.

(21) Appl. No.: 18/210,323

(22) Filed: Jul. 14, 2023

(65) Prior Publication Data

US 2023/0411908 A1 Dec. 21, 2023

(30) Foreign Application Priority Data

Jun. 18, 2022 (CN) ........................ 202210693584.X

(51) Int. Cl.

*H01R 13/64* (2006.01)
*H01R 12/72* (2011.01)
(Continued)

(52) U.S. Cl.

CPC ....... *H01R 13/6471* (2013.01); *H01R 12/721* (2013.01); *H01R 13/405* (2013.01); *H01R 13/516* (2013.01)

(58) Field of Classification Search

CPC .............. H01R 13/6471; H01R 12/721; H01R 13/405; H01R 13/516; H01R 13/6477;
(Continued)

(56) References Cited

U.S. PATENT DOCUMENTS 6,645,009 B1 * 11/2003 Billman ............. H01R 13/6471 439/108
6,843,679 B2 * 1/2005 Kuo ................... H01R 13/6585 439/497
(Continued)

FOREIGN PATENT DOCUMENTS

CN 216162036 U 4/2022

*Primary Examiner* — Truc T Nguyen
(74) *Attorney, Agent, or Firm* — Ming Chieh Chang

(57) ABSTRACT

An electrical connector includes: an insulating housing having two side walls defining signal passageways and grounding passageways; two rows of terminals including signal terminals in the signal passageways and grounding terminals in the grounding passageways, each terminal having a retained portion and an elastic arm with a contacting portion extending into the card slot; a one-piece inserting member assembled in the insulating housing, the inserting member defining first inserting portions in the signal passageways and made from insulating plastic, and second inserting portions in the grounding passageways and at least partly made from conductive plastic, the second inserting portions mechanically connecting the grounding terminals; and a metallic member retained in the inserting member, wherein the metallic member defines two rows of grounding fingers, the grounding fingers are located in corresponding second inserting portions respectively and directly connect or face but not directly connect with corresponding grounding terminals respectively.

16 Claims, 13 Drawing Sheets

(51) Int. Cl.
*H01R 13/405* (2006.01)
*H01R 13/516* (2006.01)
*H01R 13/6471* (2011.01)

(58) Field of Classification Search
CPC .... H01R 13/41; H01R 13/64; H01R 2107/00; H01R 12/71; H01R 13/648
See application file for complete search history.

(56) References Cited

U.S. PATENT DOCUMENTS

| | | | | |
|---|---|---|---|---|
| 8,177,564 | B1 | 5/2012 | Ito et al. | |
| 9,531,129 | B2 | 12/2016 | de Boer | |
| 9,531,130 | B1 | 12/2016 | Phillips et al. | |
| 10,243,304 | B2 | 3/2019 | Kirk et al. | |
| 10,381,767 | B1 | 8/2019 | Milbrand, Jr. et al. | |
| 2008/0045083 | A1* | 2/2008 | Metral | H01R 13/6585 439/108 |
| 2012/0282808 | A1* | 11/2012 | Luo | H01R 13/6471 439/628 |
| 2017/0170606 | A1 | 6/2017 | Phillips et al. | |
| 2018/0013240 | A1* | 1/2018 | Takeuchi | H01R 13/05 |
| 2019/0173209 | A1* | 6/2019 | Lu | H01R 12/716 |
| 2020/0076135 | A1* | 3/2020 | Tang | H01R 12/721 |
| 2020/0266584 | A1 | 8/2020 | Lu | |
| 2020/0350717 | A1* | 11/2020 | Dong | H01R 13/112 |
| 2021/0126402 | A1 | 4/2021 | Zhang et al. | |
| 2021/0135389 | A1* | 5/2021 | Jiang | H01R 13/516 |
| 2021/0135404 | A1 | 5/2021 | Jiang | |
| 2022/0216635 | A1 | 7/2022 | Little et al. | |
| 2022/0368076 | A1* | 11/2022 | Little | H01R 13/6592 |
| 2023/0139926 | A1* | 5/2023 | Little | H01R 13/6471 439/626 |
| 2023/0170649 | A1* | 6/2023 | Hsiao | H01R 12/724 439/92 |
| 2023/0187879 | A1* | 6/2023 | Tamai | H01R 13/405 439/108 |

* cited by examiner

ELECTRICAL CONNECTOR WITH IMPROVED INSERTING MEMBER

BACKGROUND OF THE INVENTION

Field of the Invention

The present invention relates generally to an electrical connector with an improved inserting member to change dielectric constant around signal terminals.

Description of Related Arts

In card edge connectors, grooves for terminals have a large size for ease of assembling of the terminals including signal terminals and grounding terminals, resulting in decrease of dielectric constant around the signal terminals. Also the signal terminals are long and thin, resulting in a large inductive impedance of the signal terminals. US20210126402A1 discloses an insulating inserting member to overcome these problems. But this is not enough in a higher speed connector, such as PCIE 6.0 connector.

An improved electrical connector is desired.

SUMMARY OF THE INVENTION

An object of the present invention is to provide an electrical connector with an improved inserting member.

To achieve the above-mentioned object, an electrical connector comprises: an insulating housing having a mating face, a card slot recessed from the mating face with a floor face facing the mating face, and two side walls located at opposite sides of the card slot, each of the side walls defining a plurality of signal passageways and a plurality of grounding passageways; two rows of terminals located on the side walls, each row of terminals comprising a plurality of signal terminals in the signal passageways and a plurality of grounding terminals in the grounding passageways, each terminal comprising a retained portion retained in the insulating housing and an elastic arm with a contacting portion extending into the card slot; a one-piece inserting member assembled in the insulating housing, the inserting member defining a plurality of first inserting portions in the signal passageways and made from insulating plastic, and a plurality of second inserting portions in the grounding passageways and at least partly made from conductive plastic, the second inserting portions mechanically connect corresponding grounding terminals respectively; and a metallic member retained in the inserting member between the two rows of terminals, wherein the metallic member defines two rows of grounding fingers, and the grounding fingers are located in corresponding second inserting portions respectively and mechanically connect or face but not directly connect with corresponding grounding terminals respectively.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
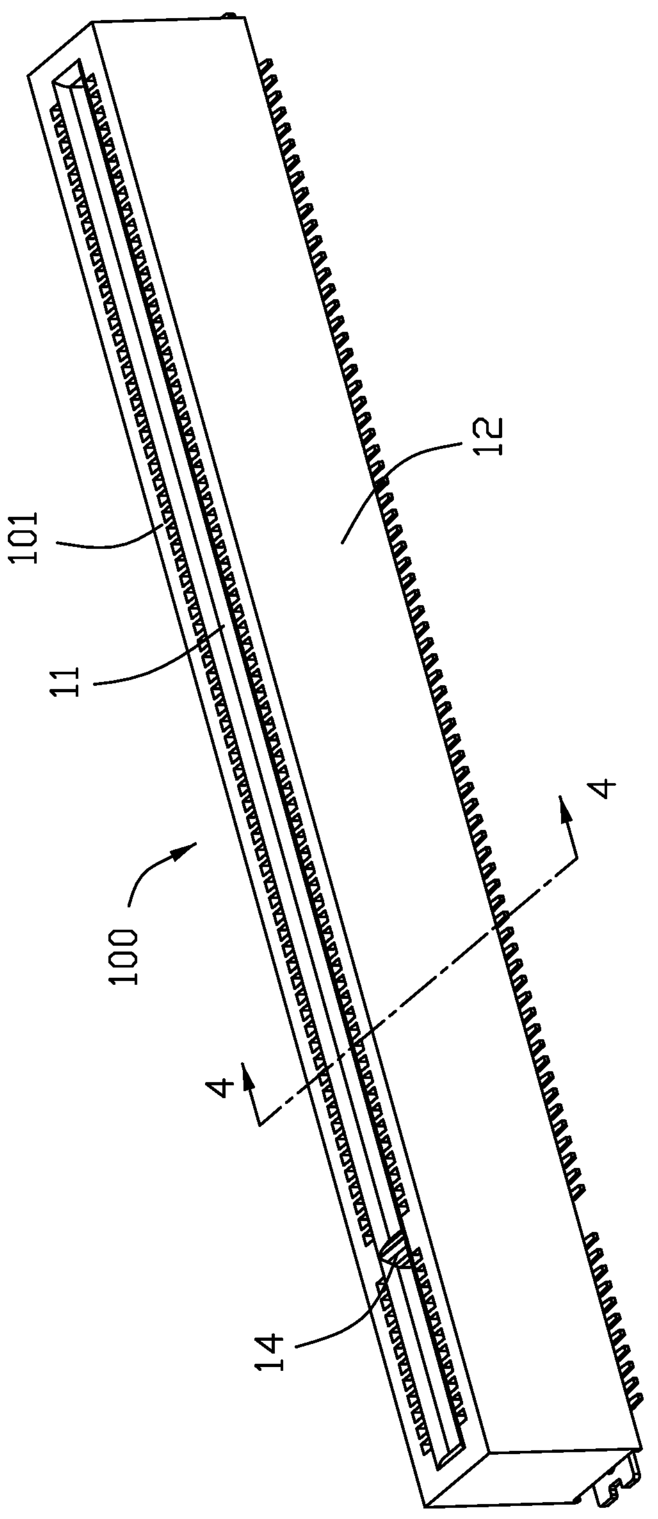
FIG. 1 is a top perspective view of an electrical connector according to a first embodiment of the present invention.
Figure 2:
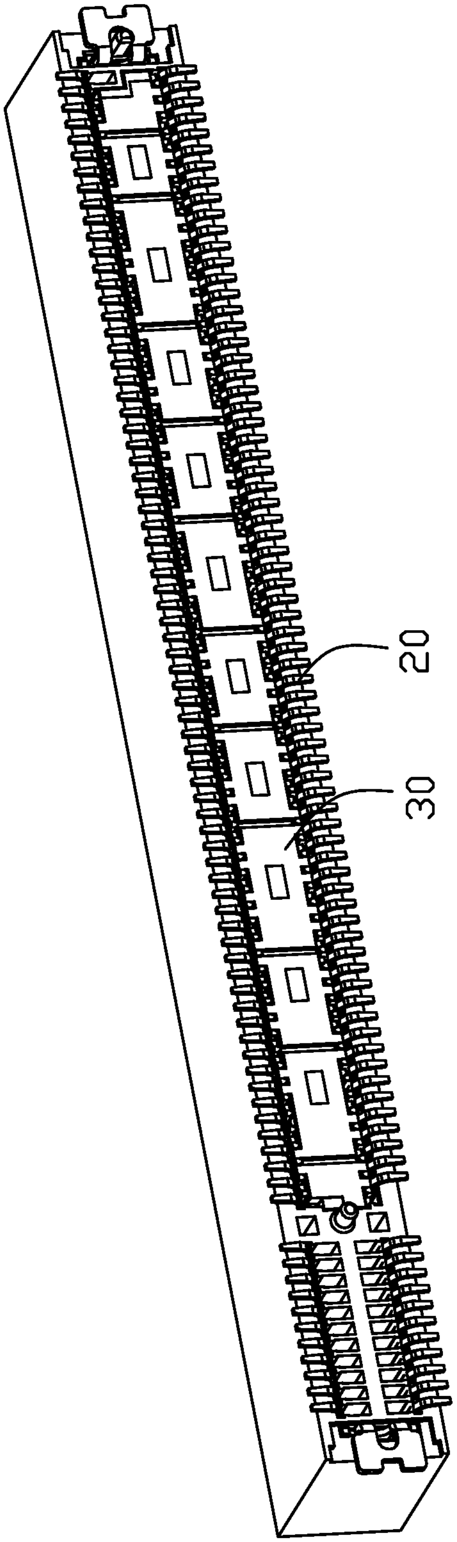
FIG. 2 is a bottom perspective view of an electrical connector in FIG. 1.

Reference will now be made to the drawing figures to describe the preferred embodiment of the present invention in detail.

An electrical connector 100 of this present invention is of a card edge connector, which is used to be inserted with a PCI Express CEM module for transmission high signals in this embodiment. Referring to FIGS. 1-4, the electrical connector 100 includes an insulating housing 10, a plurality of terminals and an inserting member 30. The housing 10 defines a mating face 101, and a card slot 11 recessed from the mating face 101, the card slot 11 defines a floor face 102 and two inner faces 103 connecting with the floor face 102 and the mating face 101. The mating face 101 is defined on the top face of the housing 10 in this embodiment, but not limited. The housing 10 includes two opposite side walls 12 at opposite sides of the card slot 102, each side wall 12 defines a row of passageways 13 to receive the terminals, respectively. The passageways 13 run downwards through a bottom of the housing 10, inwards through the inner faces 103 of the side walls 12 and upwards through the mating face 101. The housing 10 defines an assembly cavity 104 at the bottom thereof to communicate the inserting member 30.

Figure 3:
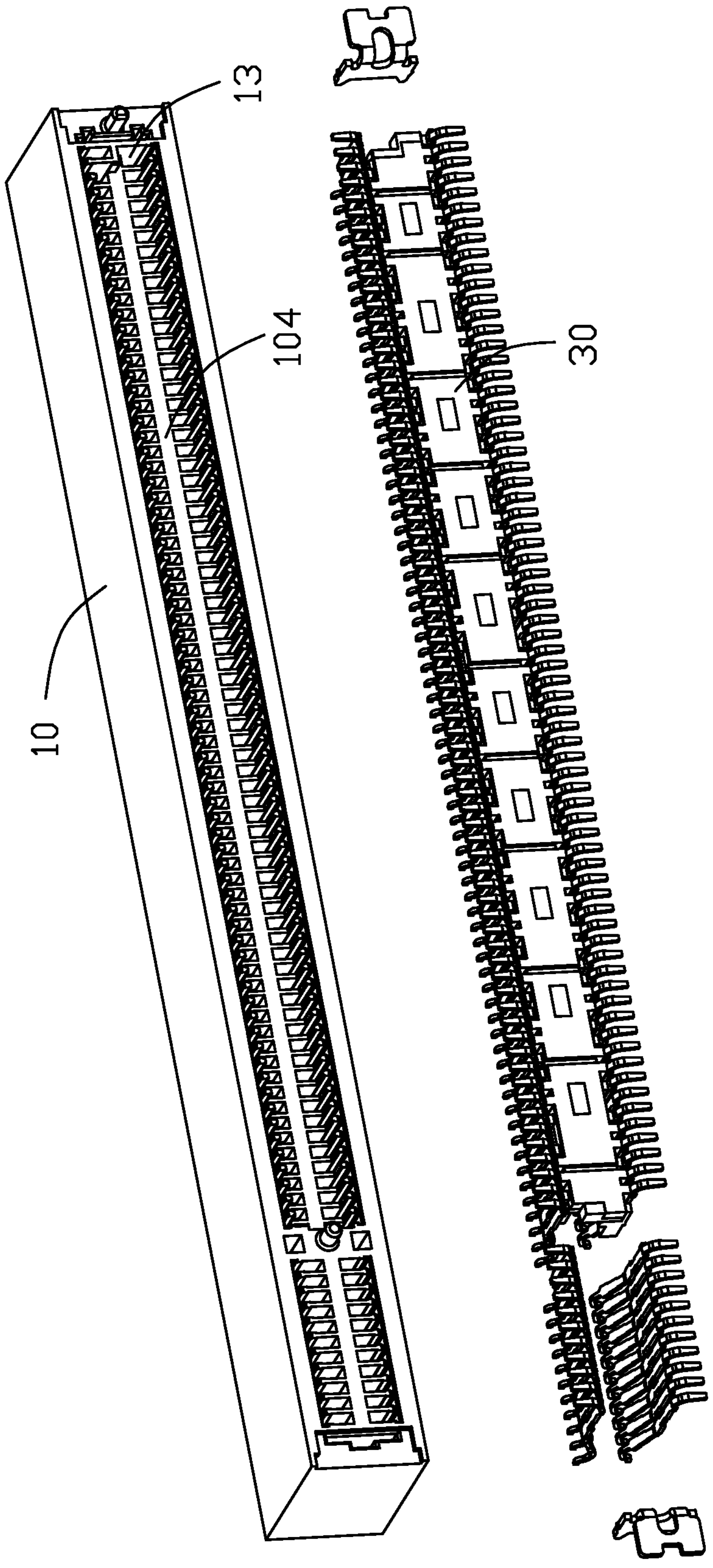
FIG. 3 is an exploded perspective view of the electrical connector in FIG. 2.
Figure 5:
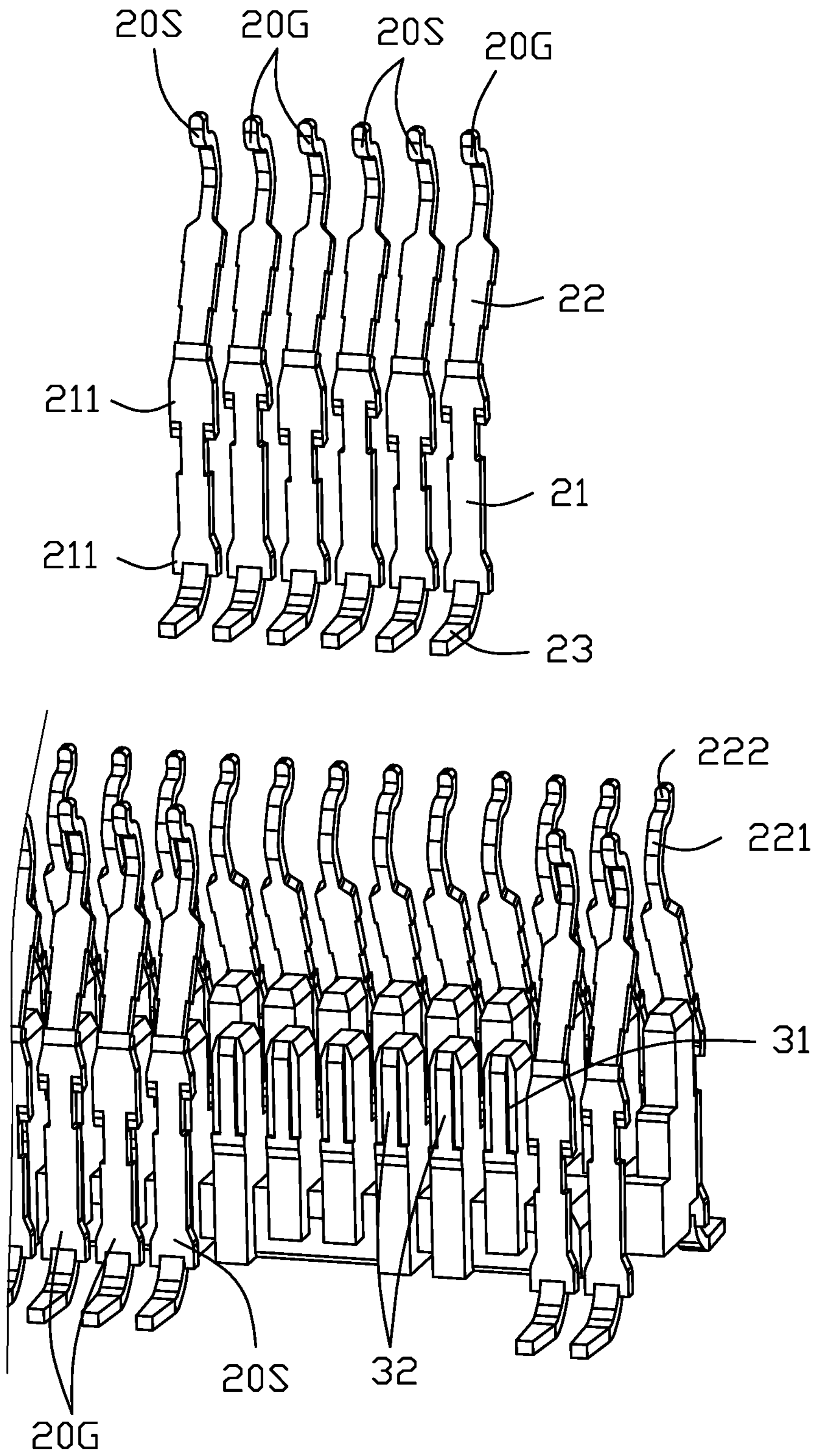
FIG. 5 is a partly exploded perspective view of an inserting member and two rows of terminals in part in FIG. 1.

Referring to FIGS. 3 and 5, the terminal 20 includes a retained portion 21, an elastic arm 22 and a leg portion 23, the retained portions 21 are retained in the passageway 13, the elastic arms 22 go across the passageways 13 and protrude into the card slot 11, the elastic arm 22 defines a contacting portion 221 for touching pads defined on the card module. In this embodiment, the retained portion 21 is of upright structure and defines two opposite cutting faces and a barb or widened section 211 on each cutting face. The terminals 20 are inserted into the passageways 13 from the bottom of housing, the upright retained portions 21 abut against the inner faces of the passageways 13, the barbs 211 are interfered with another two inner faces of the passageways 13, the elastic arms 22 go across the passageways 13 and project into the card slot 11. The passageway 13 has a larger size in the longitudinal direction for the pass of the arc elastic arms 22. A free distal end of the elastic arm 22 defines a preloading portion 222 folded therefrom, the preloading portions 222 press against corresponding passageways 13 proximate to the mating face 101. In this embodiment, as shown in FIG. 1, the card slot 11 is divided to two parts by the key 14, the left part is loaded with power terminals, the right left part is loaded with signal terminals 20S, grounding terminals 20G and other functional terminals, each row of terminals 20 at least includes pairs of differential terminals composed of two adjacent signal terminals 20S, and two grounding terminals 20G located between two adjacent pairs of differential terminals 20S as shown in FIG. 5.

Figure 6:
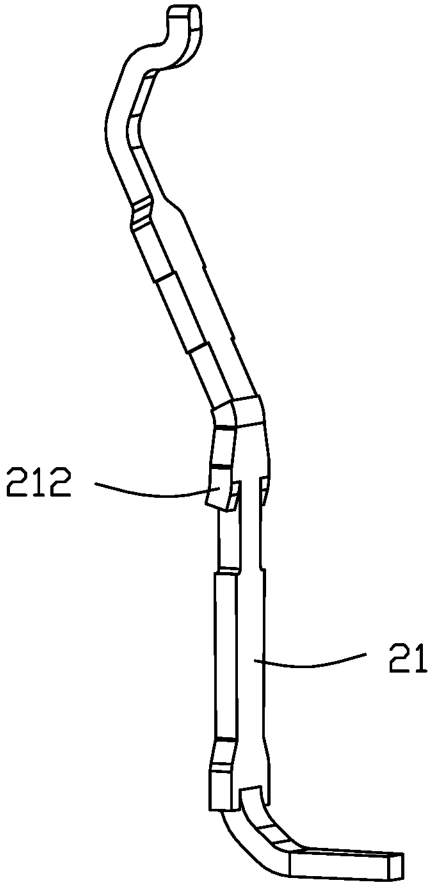
FIG. 6 is a perspective view of one terminal.
Figure 7:
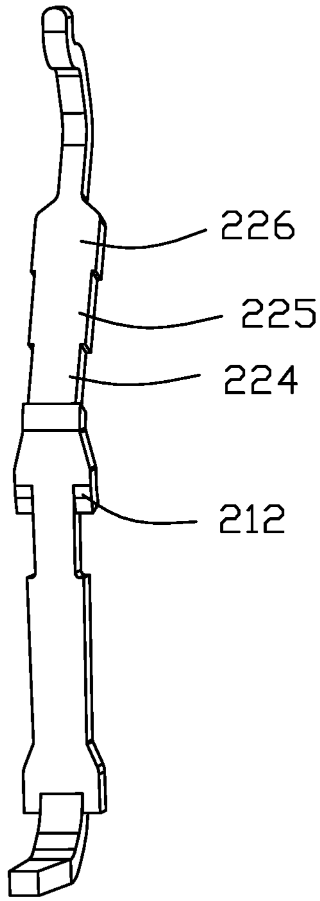
FIG. 7 is another perspective view of the terminal in FIG. 6.

Referring to FIGS. 6-7, the retained portion 21 of the terminal defines a pair of tabs 212 punched therefrom towards the card slot 11. Therefore, the barbs 211 are interference with the passageway 13 in the longitudinal direction, the tabs 212 are retained within the passageway 13 in the lateral direction. The elastic portion 22 of the terminal is of three-step shape, first section 224, second section 225, third section 226 from a lower root of the elastic arms, and the three sections are widened one by one, to improve the mechanical and electric performance of the terminal.

The passageways 13 correspond the terminals 20 one by one, the signal passageways 13G of the passageways receive the signal terminals 20S, the grounding passageways 13G of the passageways 13 receive the grounding terminals 20G. The inserting member 30 is of one-piece and assembled into the housing 10. The inserting member 30 includes a plurality of first inserting portions or post 31 adapted to be inserted into the signal passageways 13S and a plurality of second inserting portions 32 adapted to be inserted into the grounding passageways 13G. In this embodiment, the first inserting portions 31 are made from insulating material, the dielectric constant of the part around the terminals 20 are changed so as to adjust the impedance of the terminals after the first inserting portions 31 are filled the signal passageways 13S. The second inserting portions 32 are made from conductive plastic, which mechanically connect corresponding grounding terminals 20G to obtain electrically connection to shift the resonance range to a higher range. The second inserting portions make a littler change to the dielectric constant around the terminals because of conductive plastic material. The second inserting portions unitarily connect the grounding terminals so as to shorten the electric ground path. The first and second inserting portions of a post shape extend upwards toward the mating face 101, and proximate to the mating face 101 than the floor face 102, so as to change the dielectric constant as large as possible. Alternatively, the second inserting portions are partly made from the conductive material, i.e., part of the second inserting portion is made from the conductive plastic.

Figure 4:
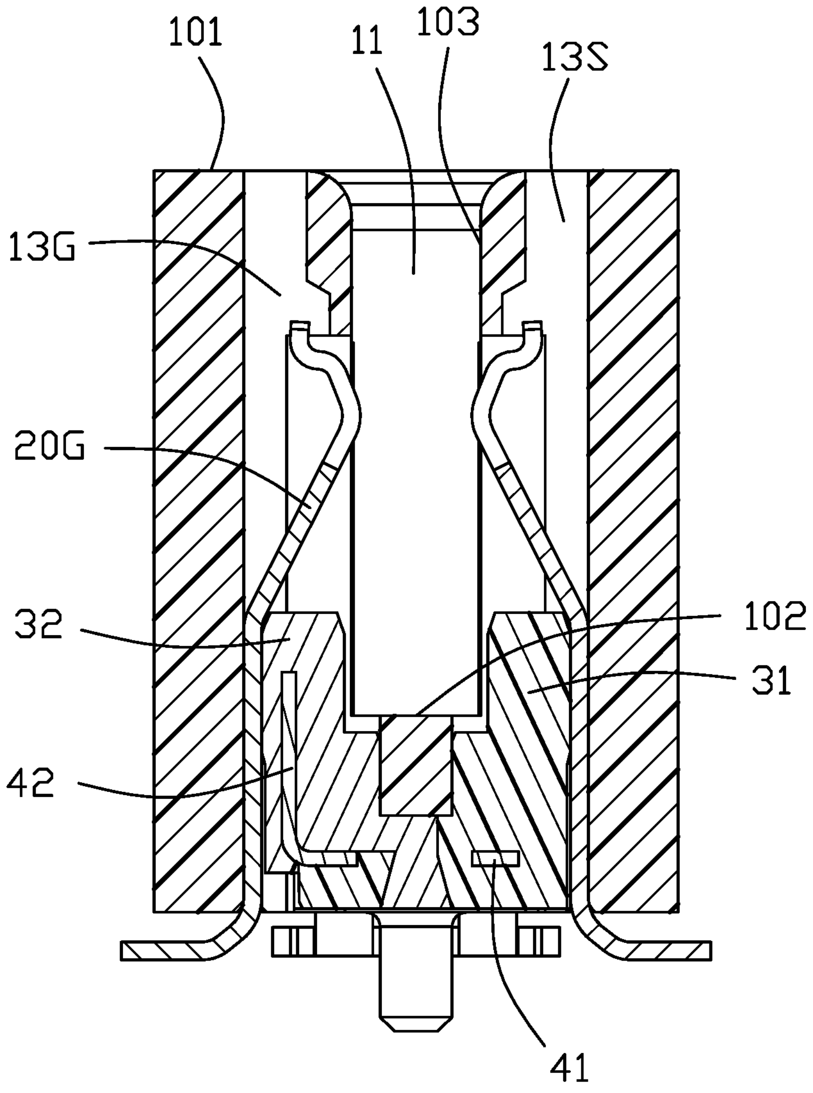
FIG. 4 is a cross-section of the electrical connector taken alone lines 4-4 in FIG. 1.
Figure 12:
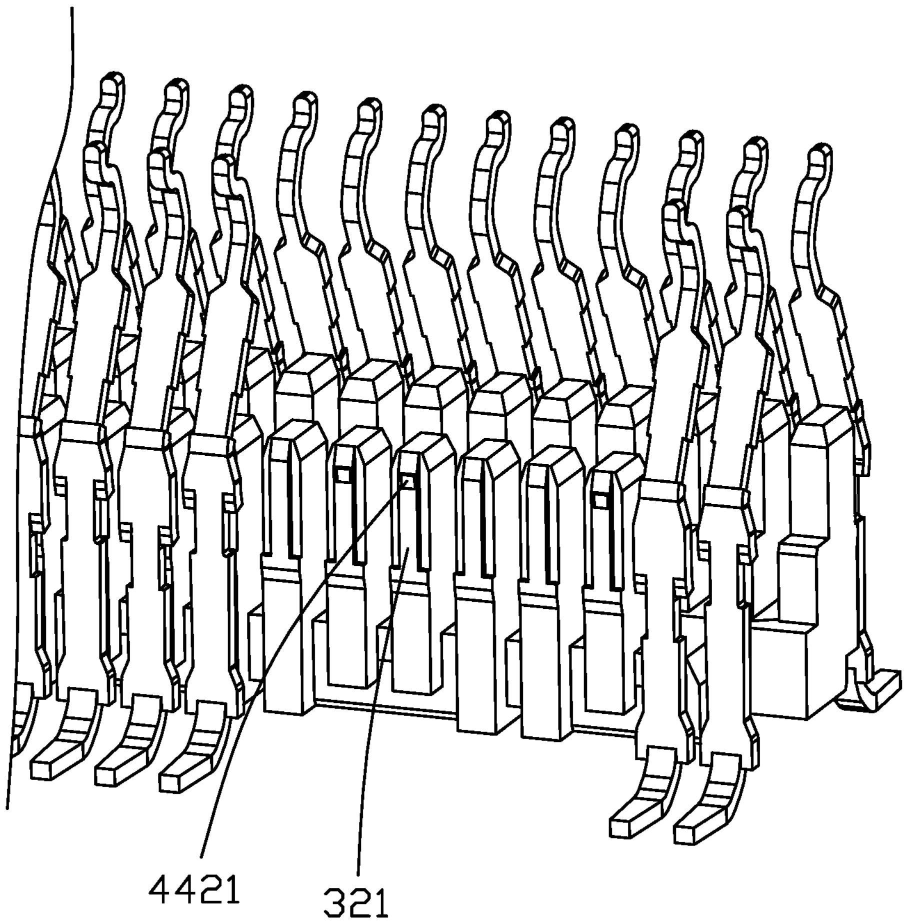
FIG. 12 is a partly exploded perspective view of an inserting member and two rows of terminals of a second embodiment of this present invention.
Figure 13:
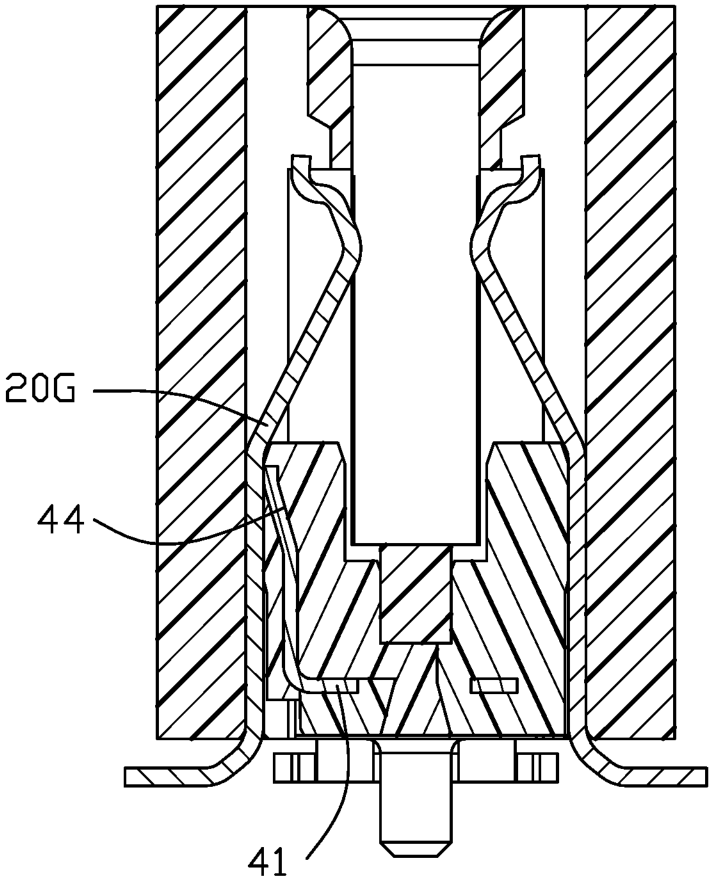
FIG. 13 is a cross-section of the electrical connector of the second embodiment, which is similar to FIG. 4.

The improvement of this embodiment is that, the inserting member 30 is embedded with a metallic/grounding member 40, as shown in FIG. 4, the metallic member 30 is embedded in the second inserting portion 32 and correspond to the grounding terminals 20G one by one. Please note, the grounding fingers are not in direct contact with the grounding terminals, but the grounding fingers are provided by capacitively coupling to the grounding terminals. Alternatively, as shown in FIGS. 12-13, distal ends of the metallic member 40 are partly exposed to souter face of the second inserting portions 32 and press against corresponding grounding terminals 20G to establish an grounding path.

Figure 8:
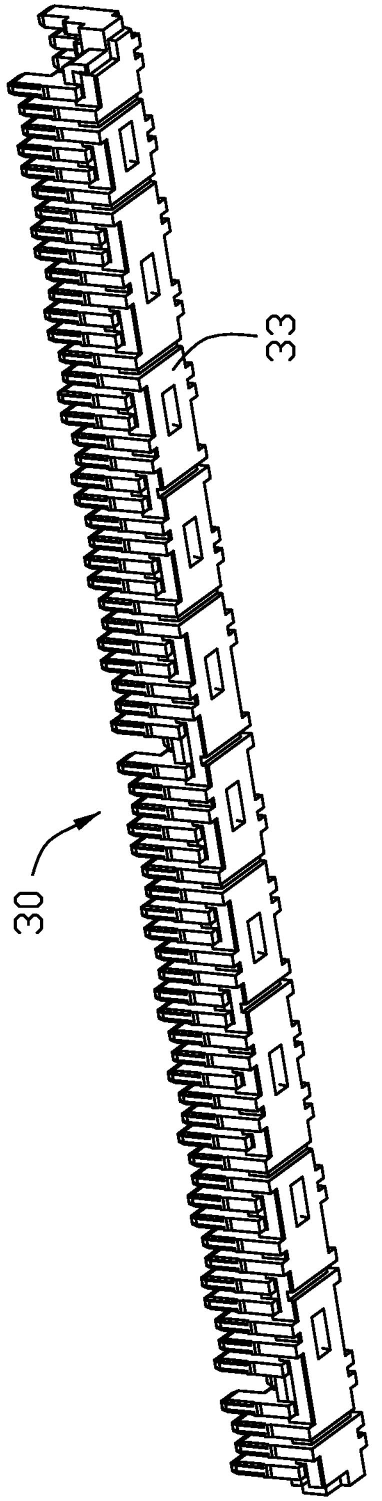
FIG. 8 is a bottom perspective view of the inserting member.
Figure 9:
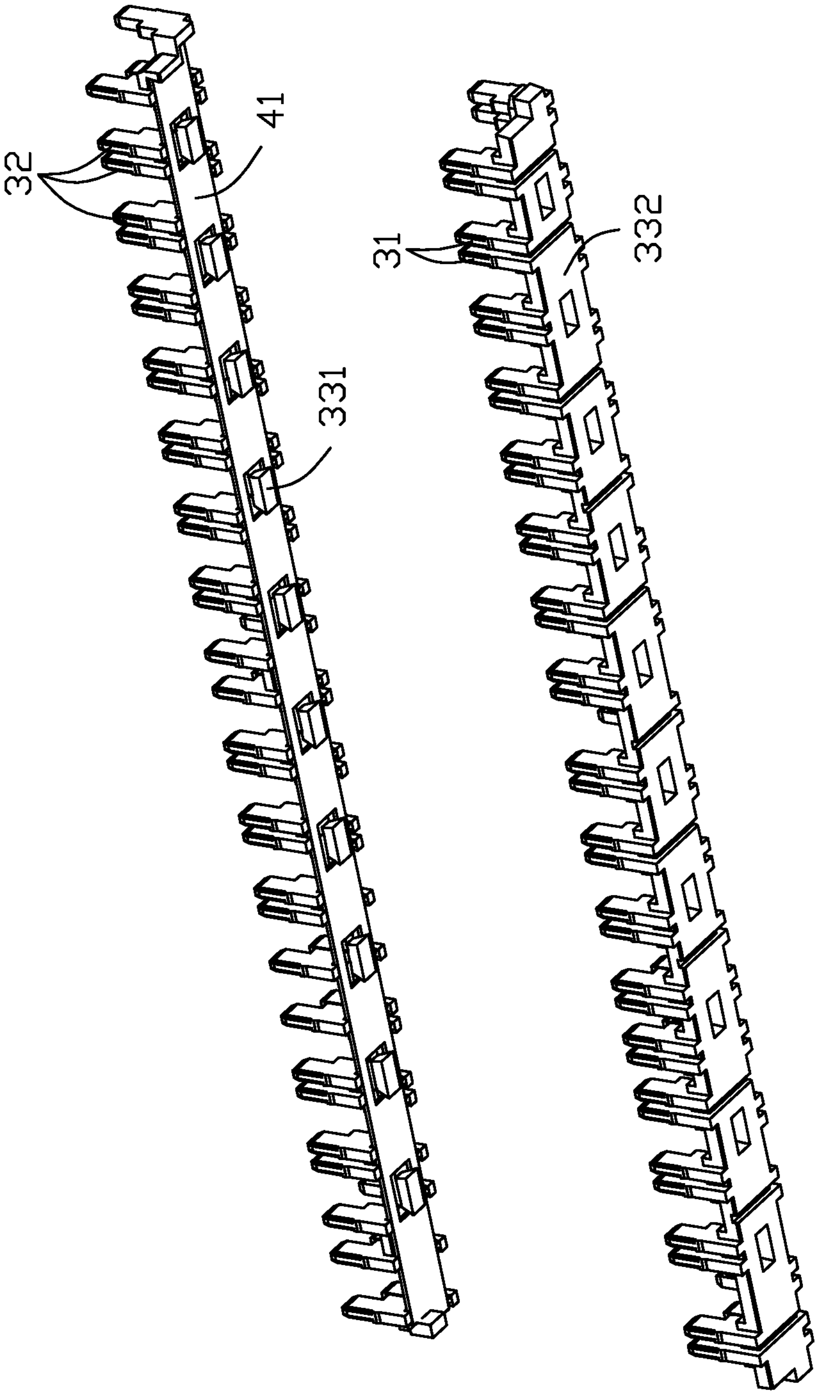
FIG. 9 is a bottom exploded perspective view of the inserting member in FIG. 8.
Figure 10:
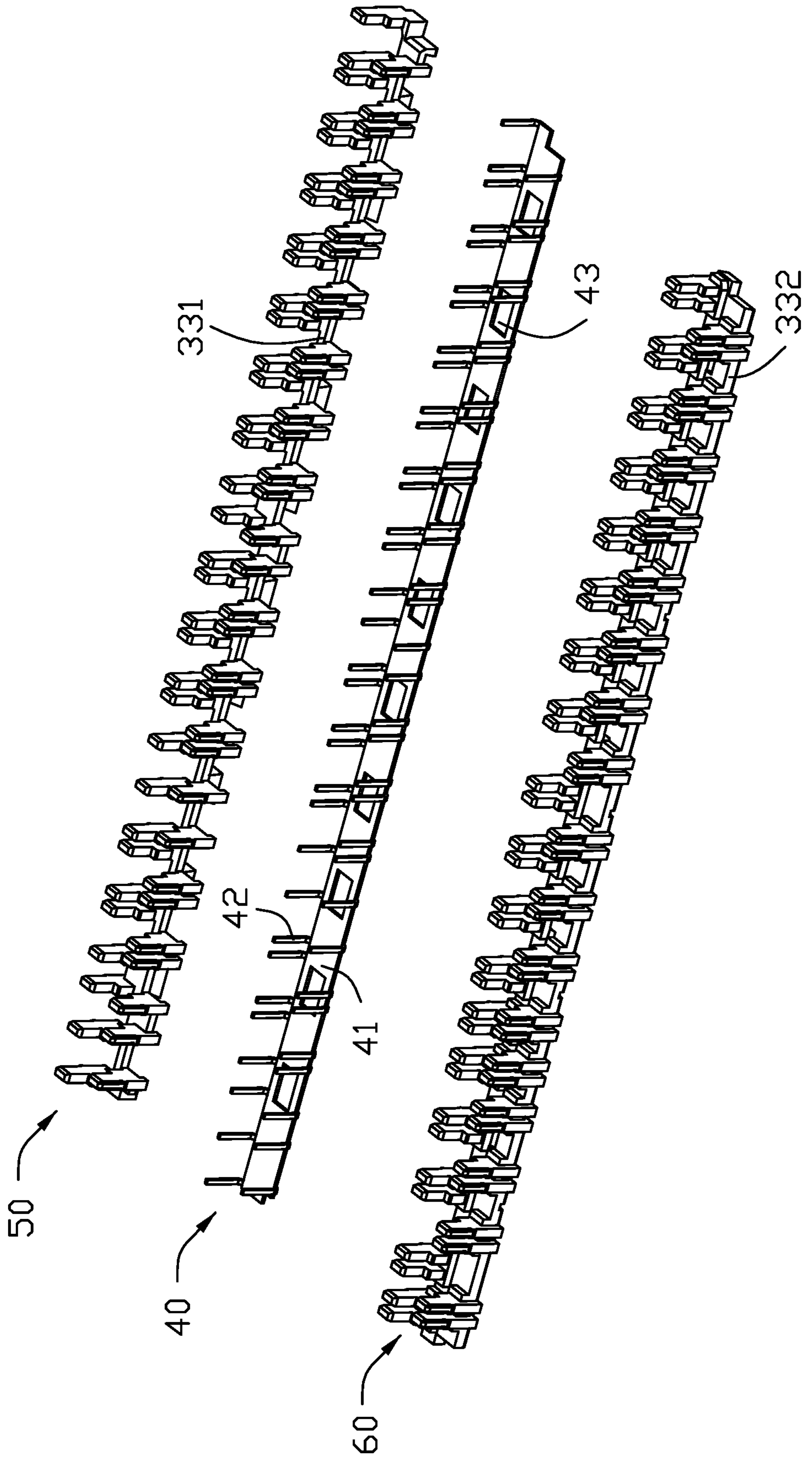
FIG. 10 is a top exploded perspective view of the inserting member in FIG. 8.

Referring to FIGS. 8-10, the metallic member 40 includes a longitudinal plate 41 and a plurality of grounding fingers 42 extending from the opposite longitudinal edges of the longitudinal plate 41, the grounding fingers 42 are of an upright plate. Conductive plastic 50 surrounds the grounding fingers 42 during a first insert molding process, thereby forming the second inserting portions 32 and the conductive layer 331 unitarily connecting all the second inserting portions 32. The longitudinal plate 41 is located a bottom side of the conductive plastic 50. Subsequently, the insulating plastic 60 forms the first inserting portions 31 and an insulating layer 332 surrounding the longitudinal plate 41 and the conductive plastic 50 by a second insert molding process. Therefore, the first inserting portions 31 extend from the insulating layer 332, the second inserting portions 32 extend the conductive layer 331, the longitudinal plate 41 is sandwiched between the insulating layer 332 and the conductive layer 331.

The conductive layer 331 and the insulating layer 332 commonly form the bottom base 33, the first inserting portions 31 and the second inserting portions 32 unitarily extend from the bottom base 33. The conductive plastic 50 in the adjacent second inserting portions 32 are unitary connected by the bottom base 33. The longitudinal plate 41 is embedded in the bottom base 33, the grounding fingers 42 are embedded in the second inserting portions 32 and are aligned with the corresponding grounding terminals 20G. The grounding fingers 42 face the corresponding grounding terminals 20G. The longitudinal plate 41 defines a plurality of through opens 43, the conductive layer 331 go through the through opens 43. Referring to FIG. 3, the longitudinal plate 41 extends from the conductive layer 331 to the insulating layer 332. The bottom base 33 is received in the assembling cavity 104.

Figure 11:
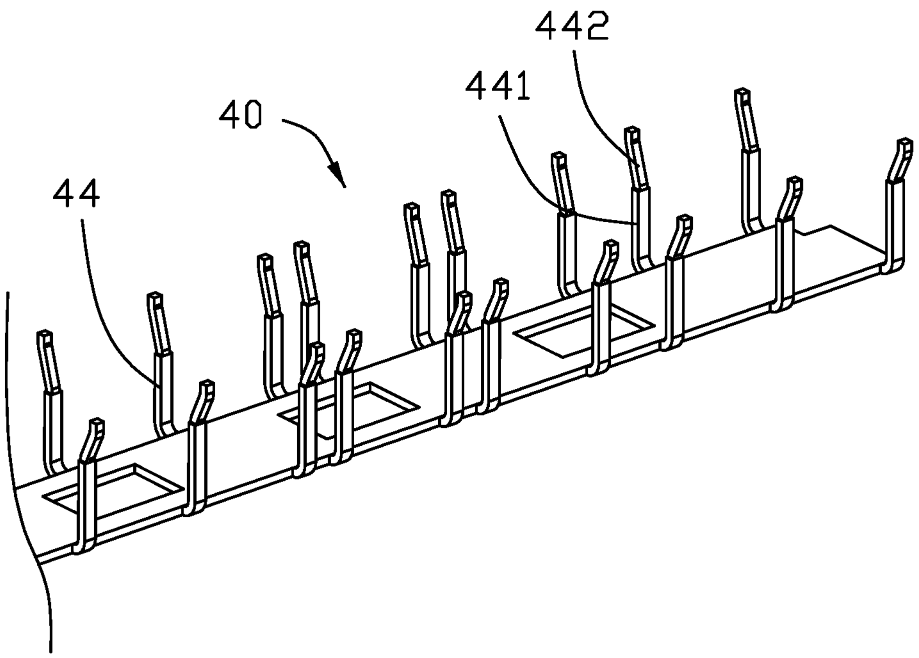
FIG. 11 is a partly exploded perspective view of the metallic shell.

In this embodiment, the second inserting portions 32 are wholly made from the conductive plastic 50, the grounding fingers 42 are wholly embedded in the corresponding first inserting portions 31. FIGS. 11-12 illustrate a second embodiment, the grounding fingers 44 go out of the second inserting portions 32 and press against the corresponding grounding terminals 20G. The grounding fingers 44 extend from the longitudinal plate 41 and each include an upright portion 441 and a slanting portion 442 slanting outwards. The second inserting portion 32 defines an outer face facing the grounding terminal and the distal end 4421 of the slanting portion 42 exposed to the second inserting portion and touch corresponding grounding terminal.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

an insulating housing having a mating face, a card slot recessed from the mating face with a floor face facing the mating face, and two side walls located at opposite sides of the card slot, each of the side walls defining a plurality of signal passageways and a plurality of grounding passageways;

two rows of terminals located on the side walls, each row of terminals comprising a plurality of signal terminals in the signal passageways and a plurality of grounding terminals in the grounding passageways, each terminal comprising a retained portion retained in the insulating housing and an elastic arm with a contacting portion extending into the card slot;

a one-piece inserting member assembled in the insulating housing, the inserting member defining a plurality of first inserting portions in the signal passageways and made from insulating plastic, and a plurality of second inserting portions in the grounding passageways and at least partly made from conductive plastic, the second inserting portions mechanically connecting corresponding grounding terminals respectively; and a metallic member retained in the inserting member between the two rows of terminals;

wherein the metallic member defines two rows of grounding fingers, the grounding fingers are located in corresponding second inserting portions respectively, and the grounding fingers directly connect or face but not directly connect with corresponding grounding terminals respectively.

2. The electrical connector as claimed in claim 1, wherein the grounding fingers go across the conductive plastic of the second inserting portions and directly connect with the corresponding grounding terminals.

3. The electrical connector as claimed in claim 2, wherein the grounding finger comprises an upright portion and a slanting portion extending from the upright portion, the slanting portion touching the retaining portion of the corresponding grounding terminal.

4. The electrical connector as claimed in claim 1, wherein the inserting member comprises a bottom base, the first inserting portions and the second inserting portions extend from the bottom base, the conductive plastics in adjacent second inserting portions are electrically united via the bottom base, the metallic member comprises a longitudinal plate embedded in the bottom base, the grounding fingers extend from two opposite longitudinal edges and electrically connect with the grounding terminals.

5. The electrical connector as claimed in claim 1, wherein the second inserting portions are wholly made from conductive plastic, and the grounding fingers are wholly embedded in the second inserting portions.

6. The electrical connector as claimed in claim 1, wherein the metallic member comprises a longitudinal plate and the grounding fingers extending from the longitudinal edges of the longitudinal plate, the conductive plastic surrounds the grounding terminals by a first insert molding process of forming the second inserted portions, the longitudinal plate is located at a bottom of the conductive plastic, and the insulating plastic forms the second inserting portions and surrounds the longitudinal plate and the conductive plastic by a second insert molding process.

7. The electrical connector as claimed in claim 1, wherein the inserting member includes a bottom base which includes a conducive layer and an insulating layer, the first inserting portions extend from the conductive layer, the second inserting portions extend from the insulating layer, and the longitudinal plate is sandwiched between the conductive layer and the insulating layer.

8. The electrical connector as claimed in claim 7, wherein the longitudinal plate defines through openings, and the conductive plastic is filled within the through openings.

9. The electrical connector as claimed in claim 8, wherein the longitudinal plate extends from the conductive layer to the insulating layer.

10. The electrical connector as claimed in claim 1, wherein the first inserting portions are made from insulating plastic, the second inserting portions are made from insulating plastic and embedded with conductive plastic, and the conductive plastic in the second inserting portions is exposed to the second inserting portions and contacts with the corresponding terminals.

11. An electrical connector comprising:

an insulating housing comprising two opposite side walls and a card slot with a floor face between the two side walls, each of the side walls defining signal passageways and grounding passageways;

a row of terminals located on each side wall and comprising signal terminals accommodated in the signal passageways and grounding terminals accommodated in the grounding passageways, the terminals comprising retaining portions retained in the passageways and elastic arms going across corresponding passageways;

an inserting member assembled in the insulating housing and defining a plurality of insulating posts and a plurality of conductive posts, wherein the signal passageways are filled with corresponding insulating posts of the inserting member, the grounding passageways are filled with corresponding conductive posts of the inserting member without any insulating portions in a mating direction of the electrical connector, and the conductive posts contact corresponding grounding terminals respectively; and a grounding member embedded in the inserting member;

wherein the grounding member defines a longitudinal plate and a row of grounding fingers extending from the longitudinal base, and the grounding fingers electrically connect corresponding grounding terminals.

12. The electrical connector as claimed in claim 11, wherein upper distal end of each grounding finger is exposed to contact a corresponding grounding terminal.

13. The electrical connector as claimed in claim 11, wherein the grounding finger is of an upright construct, which is hidden in the conductive post and directly faces but is separated from a corresponding grounding terminal.

14. The electrical connector as claimed in claim 11, wherein the grounding member comprises a longitudinal plate embedded in the inserting member and the grounding fingers extend upwards from the longitudinal plate, the longitudinal plate having a plurality of through holes.

15. The electrical connector as claimed in claim 11, wherein the conductive posts and the insulating post extend upward beyond the floor face.

16. The electrical connector as claimed in claim 11, wherein the conductive posts are made from conductive plastic and unitarily and electrically connect together.

* * * * *